(12) United States Patent
Liao et al.

(10) Patent No.: US 12,528,225 B2
(45) Date of Patent: Jan. 20, 2026

(54) COMPOSITE REINFORCED MOISTURE-PROOF FIBERBOARD, AND PREPARATION APPARATUS AND METHOD THEREOF

(71) Applicant: Furen Wood Industry (Putian) Co., LTD., Putian (CN)

(72) Inventors: Danxiong Liao, Putian (CN); Congrong Lan, Putian (CN); Xinqing Lin, Putian (CN); Qinglin Zheng, Putian (CN); Wei Wang, Putian (CN); Hong Wang, Putian (CN)

(73) Assignee: Furen Wood Industry (Putian) Co., LTD., Putian (CN)

( * ) Notice: Subject to any disclaimer, the term of this patent is extended or adjusted under 35 U.S.C. 154(b) by 198 days.

(21) Appl. No.: 18/333,126

(22) Filed: Jun. 12, 2023

(65) Prior Publication Data

US 2024/0367341 A1 Nov. 7, 2024

(30) Foreign Application Priority Data

May 6, 2023 (CN) .......................... 202310502416.2

(51) Int. Cl.
*B27N 3/16* (2006.01)
*B27N 1/00* (2006.01)
*B27N 3/02* (2006.01)
*B27N 3/18* (2006.01)
(52) U.S. Cl.
CPC ................. *B27N 3/16* (2013.01); *B27N 1/00* (2013.01); *B27N 3/02* (2013.01); *B27N 3/18* (2013.01)

(58) Field of Classification Search
CPC ... B27N 3/16; B27N 1/00; B27N 3/02; B27N 3/18
See application file for complete search history.

(56) References Cited

FOREIGN PATENT DOCUMENTS

| CN | 206393776 U | | 8/2017 | |
|---|---|---|---|---|
| CN | 210361776 U | | 4/2020 | |
| CN | 211136608 U | * | 7/2020 | |
| CN | 212707274 U | | 3/2021 | |
| CN | 112606162 A | | 4/2021 | |
| CN | 215150054 U | | 12/2021 | |
| CN | 113958805 A | * | 1/2022 | ............ B24B 55/06 |
| CN | 114434585 A | | 5/2022 | |

(Continued)

*Primary Examiner* — George R Koch

(57) ABSTRACT

The application discloses a composite reinforced moisture-proof fiberboard, and a preparation apparatus and method thereof, and belongs to the technical field of moisture-proof fiberboard preparation apparatus. A wooden board that needs an adhesive application process is placed on a conveying assembly and conveyed to a lower part of a grinding disc assembly. Then, a first levelling assembly, a second levelling assembly, and a vertical electric telescopic rod are started to adjust the grinding disc assembly to perform grinding and adhesive application on the wooden board. After adhesive application is completed, the conveying assembly is started again to drive the wooden board to move to perform high temperature drying treatment through a high temperature drying assembly. An adhesive solution thrown out during grinding and adhesive application falls onto side return covers and flows back to a recovery pool for collection and reuse.

1 Claim, 13 Drawing Sheets

(56) References Cited

FOREIGN PATENT DOCUMENTS

| | | | |
|---|---|---|---|
| CN | 114654556 A | * 6/2022 | ............. B27N 3/183 |
| CN | 216976043 U | 7/2022 | |
| CN | 218495638 U | 2/2023 | |
| DE | 10102382 A1 | 8/2002 | |
| DE | 102006048471 A1 | 4/2008 | |
| DE | 102015206469 B3 | 10/2016 | |
| JP | 2002160204 A | 6/2002 | |

* cited by examiner

COMPOSITE REINFORCED MOISTURE-PROOF FIBERBOARD, AND PREPARATION APPARATUS AND METHOD THEREOF

TECHNICAL FIELD

The application relates to a moisture-proof fiberboard, in particular to a composite reinforced moisture-proof fiberboard. The application also relates to a preparation apparatus of a moisture-proof fiberboard, in particular to a preparation apparatus of a composite reinforced moisture-proof fiberboard. The application also relates to a preparation method of a moisture-proof fiberboard, in particular to a preparation method of a composite reinforced moisture-proof fiberboard, and belongs to the technical field of moisture-proof fiberboard preparation apparatuses.

BACKGROUND

In the related art, the preparation of a moisture-proof fiberboard, such as a preparation process of a moisture-proof fiberboard disclosed in Application No. CN202011465241.5, includes the following steps that: pine wood, miscellaneous wood, and a spicebush are cut into slices through a chipper; the slices and spicebush leaves are added to a defibrator for cooking, and molten paraffin is added for fiber defibrating; the cooking pressure in the hot mill is 8-8.5 bar, and the cooking time is 3-4 min; the amount of the spicebush leaves is 10%-16% of the amount of the slices, and the addition amount of the paraffin is 7-10 kg/m3; an adhesive and molten epoxy resin are added into defibrated fibers, the addition amount of the adhesive is 70-100 kg/m3, and the addition amount of the epoxy resin is 60-90 kg/m3; the fibers with the adhesive applied to are dried, sorted, paved to be formed, and pressed by a press to form a fiberboard; and a plurality of grooves are formed in a board surface of the pressed and formed fiberboard by adopting a sand blasting machine through uniform collision, and then a protective layer is uniformly sprayed on the board surface of the fiberboard.

However, the preparation of the moisture-proof fiberboard in the related art is complicated in process at first and does not have a function of early dust removal for the board. In addition, when an adhesive application process is performed, the simple smearing has no relatively good device improvement substantially. Secondly, the adhesive application process and a drying process use different devices, which also take up more space to increase production costs and reduce production efficiency. For this reason, a composite reinforced moisture-proof fiberboard, and a preparation apparatus and method thereof are designed to solve the above problems.

SUMMARY

The main purpose of the application is to provide a composite reinforced moisture-proof fiberboard, and a preparation apparatus and method thereof. A wooden board that needs an adhesive application process is placed on a conveying assembly and conveyed to a lower part of a grinding disc assembly. Then, a first levelling assembly, a second levelling assembly, and a vertical electric telescopic rod are started to adjust the grinding disc assembly to perform grinding and adhesive application on the wooden board to perform grinding and adhesive application on the wooden board. A feed pump is started to feed a feed pipe assembly, and then the wooden board enters a feed rotating cylinder assembly through the feed pipe assembly and enters the grinding disc assembly through the feed rotating cylinder assembly to perform the adhesive application process. After adhesive application is completed, the conveying assembly is started again to drive the wooden board to move to perform high temperature drying treatment through a high temperature drying assembly. An adhesive solution thrown out during grinding and adhesive application falls onto side return covers and flows back to a recovery pool for collection and reuse, and the adhesive solution located on the conveying assembly may also penetrate through the conveying assembly and fall into the recovery pool for recovery.

The purpose of the application may be achieved by adopting the following technical solution.

A preparation apparatus of a composite reinforced moisture-proof fiberboard includes a conveying assembly. Side return covers are installed on both sides of the conveying assembly, a side plate is installed at the top of the side return cover, a recovery pool is arranged below the conveying assembly, and the recovery pool communicates with the side return covers. A first levelling assembly is installed at the top middle of the side plate, a second levelling assembly perpendicular to the first levelling assembly is arranged at an output end of the first levelling assembly, a vertical electric telescopic rod is installed at an output end of the second levelling assembly, a placing frame assembly is installed at an output end of the vertical electric telescopic rod, a driving assembly is arranged at the side of the placing frame assembly, a feed rotating cylinder assembly is installed on the placing frame assembly through a bearing, the bottom of the feed rotating cylinder assembly communicates with a grinding disc assembly, the driving assembly drives the feed rotating cylinder assembly through a bevel gear assembly, the top of the feed rotating cylinder assembly communicates with a feed pipe assembly, and the feed pipe assembly is externally connected to a feed pump. A high temperature drying assembly is arranged at a top end of the conveying assembly, and a side clamping assembly for clamping a wooden board is arranged at the upper middle side of the conveying assembly.

Preferably, the conveying assembly includes a side slat, a conveyor belt, a transmission motor, a first transmission roller, and a second transmission roller. The side slat is installed on the inner side of the side return cover, the first transmission roller and the second transmission roller are respectively installed on both ends of the inner side of the side slat through the bearing, the conveyor belt sleeves the outer sides of the first transmission roller and the second transmission roller, the transmission motor is installed at an outer end of the side slat, and an output end of the transmission motor penetrates through the side slat and is fixed to the first transmission roller.

The first levelling assembly includes a first U-shaped frame, a first adjusting screw, a first horizontal sliding bar, a first adjusting slider, and a first adjusting motor. The first U-shaped frame is installed at the top middle of the side plate, the first adjusting screw and the first horizontal sliding bar are arranged on the inner side of the first U-shaped frame, the first adjusting motor is installed at an outer end of the first U-shaped frame, an output end of the first adjusting motor penetrates through the first U-shaped frame and is fixed to the first adjusting screw, the first adjusting slider sleeves the outer sides of the first adjusting screw and the first horizontal sliding bar, and the first adjusting slider and the first adjusting screw are engaged with each other.

Preferably, the second levelling assembly includes a second U-shaped frame, a second horizontal sliding bar, a second adjusting screw, a second adjusting slider, and a second adjusting motor. The second U-shaped frame is installed at the bottom of the first adjusting slider, the second adjusting screw and the second horizontal sliding bar are arranged on the inner side of the second U-shaped frame, the second adjusting motor is installed at an outer end of the second U-shaped frame, an output end of the second adjusting motor penetrates through the second U-shaped frame and is fixed to the second adjusting screw, and the second adjusting slider sleeves the outer sides of the second adjusting screw and the second horizontal sliding bar.

The placing frame assembly includes a U-shaped vertical frame, a filter screen, and a side U-shaped frame. The U-shaped vertical frame is installed at an output end of the vertical electric telescopic rod, the filter screen is installed at the bottom of the U-shaped vertical frame, the side U-shaped frame is installed in the middle of the outer side of the filter screen, the driving assembly is arranged on the inner side of the U-shaped frame, and the feed rotating cylinder assembly is installed on the filter screen through the bearing.

Preferably, the driving assembly includes an adjusting motor and a horizontal transmission rod. The adjusting motor is installed at the inner middle of the side U-shaped frame, and the horizontal transmission rod is installed at an output end of the adjusting motor.

The feed rotating cylinder assembly includes a rotating cylinder, an insert ring, an L-shaped end frame, and a side limit arc frame assembly. The rotating cylinder is installed on the filter screen through the bearing, the insert ring matched with the feed pipe assembly is arranged at the top of the rotating cylinder, the L-shaped end frame is installed at the outer top of the rotating cylinder, the side limit arc frame assembly is arranged at the inner top of the L-shaped end frame, and the side limit arc frame assembly and the feed pipe assembly are matched with each other.

Preferably, the grinding disc assembly includes a grinding cover, a grinding disc, through holes, and a connecting side slat. The bottom of the rotating cylinder communicates with the grinding cover, the connecting side slat is installed at a position, close to an opening, of the bottom of the grinding cover, the grinding disc is installed at the bottom of the connecting side slat, and a plurality of groups of through holes are arranged in the grinding disc.

The bevel gear assembly includes a second bevel gear and a first bevel gear. The second bevel gear is installed on an output end of the horizontal transmission rod, the outer side of the second bevel gear is engaged with the first bevel gear, and the first bevel gear sleeves the outer middle of the rotating cylinder.

Preferably, the feed pipe assembly includes a material lead-in cylinder and an outer stop collar. The material lead-in cylinder is inserted into the inner side of the insert ring, the outer stop collar is installed at the outer middle of the material lead-in cylinder, and the outer stop collar and the side limit arc frame assembly are matched with each other.

The side limit arc frame assembly includes an arc clamping plate, inner top strips, and a side electric telescopic rod. The side electric telescopic rod is installed at the inner top of the L-shaped end frame, the arc clamping plate is installed at an output end of the side electric telescopic rod, and a plurality of groups of inner top strips are arranged on the inner side of the arc clamping plate.

Preferably, the high temperature drying assembly includes a filter screen, heater strips, a fan, a concentration cover, and an end drying bin. The end drying bin is installed at a top end of the side slat, the filter screen is arranged at the inner top of the end drying bin, a plurality of groups of heater strips are arranged on the inner side of the end drying bin, the concentration cover is arranged at the inner middle of the end drying bin, and the fan is arranged at the bottom middle of the concentration cover.

Preferably, the side clamping assembly includes a side clamping electric telescopic rod and a side clamping plate. The side clamping electric telescopic rod is installed in the middle of the inner side of the side slat, and the side clamping plate is installed at an output end of the side clamping electric telescopic rod.

A preparation method of a preparation apparatus of a composite reinforced moisture-proof fiberboard includes the following steps.

At S1, wood chips are screened through a wood chip classification screen, large stones and long tree branch impurities are removed, metal of the wood chips is removed through an eddy electric iron remover, and the wood chips are cleaned through a wood chip washing machine to remove fine mud and sand impurities.

At S2, after the wood chips are cleaned by the washing machine, the wood chips enter a preheating bin, and water steam is introduced into the bin for preheating, where the temperature of the bin is 60-100° C.

At S3, then cooking is performed, the cooking time is 2.0-5.0 min, and the cooking pressure is 8.0-15 Bar.

At S4, after cooking, a wooden board that needs an adhesive application process is placed on a conveying assembly, and conveyed to a lower part of a grinding disc assembly.

At S5, then, a first levelling assembly, a second levelling assembly, and a vertical electric telescopic rod are started to adjust the grinding disc assembly to perform grinding and adhesive application on the wooden board.

At S6, a feed pump is started to feed a feed pipe assembly, then the wooden board enters a feed rotating cylinder assembly through a feed pipe assembly and enters the grinding disc assembly through the feed rotating cylinder assembly to perform the adhesive application process.

At S7, after adhesive application is completed, the conveying assembly is started again to drive the wooden board to move to perform high temperature drying treatment through a high temperature drying assembly.

At S8, an adhesive solution thrown out during grinding and adhesive application falls onto side return covers and flows back to a recovery pool for collection and reuse, and the adhesive solution located on the conveying assembly may also penetrate through the conveying assembly and fall into the recovery pool for recovery.

At S9, a keyboard type transverse density adjustment device is arranged during a paving process, so as to improve the pavement uniformity of a slab and reduce the density deviation of the slab, thereby controlling the density deviation of the slab within ±3%.

At S10, a hot pressing method is adopted, a hot pressing device is a continuous hot press, a heating medium is conduction oil, the temperature of a hot pressing board is 150-230° C., and the pressure is 0.1-4.0 $N/mm^2$.

A ratio of wood raw materials of the composite reinforced moisture-proof fiberboard is: 50-100% of pine wood and 0-50% of eucalyptus hybrid, and the thickness of the board is 4-12 mm.

The application has the following beneficial technical effects.

According to the composite reinforced moisture-proof fiberboard, and the preparation apparatus and method thereof provided by the application, the wooden board that needs the adhesive application process is placed on the conveying assembly and conveyed to the lower part of the grinding disc assembly. Then, the first levelling assembly, the second levelling assembly, and the vertical electric telescopic rod are started to adjust the grinding disc assembly to perform grinding and adhesive application on the wooden board. The feed pump is started to feed the feed pipe assembly, and then the wooden board enters the feed rotating cylinder assembly through the feed pipe assembly and enters the grinding disc assembly through the feed rotating cylinder assembly to perform the adhesive application process. After adhesive application is completed, the conveying assembly is started again to drive the wooden board to move to perform high temperature drying treatment through the high temperature drying assembly. The adhesive solution thrown out during grinding and adhesive application falls onto side return covers and flows back to the recovery pool for collection and reuse, and the adhesive solution located on the conveying assembly may also penetrate through the conveying assembly and fall into the recovery pool for recovery.

In the figures: 1. Side plate, 2. Side return cover, 3. End drying bin, 4. Side slat, 5. Filter screen conveyor belt, 6. Transmission motor, 7. Recovery pool, 8. First U-shaped frame, 9. First adjusting screw, 10. First horizontal sliding bar, 11. First adjusting motor, 12. First adjusting slider, 13. Second U-shaped frame, 14. Second adjusting slider, 15. Vertical electric telescopic rod, 16. U-shaped vertical frame, 17. Material lead-in cylinder, 18. Second horizontal slider, 19. Second adjusting screw, 20. Outer stop collar, 21. First bevel gear, 22. Second bevel gear, 23. Horizontal transmission rod, 24. Side U-shaped frame, 25. Adjusting motor, 26. Grinding cover, 27. Rotating cylinder, 28. Grinding disc, 29. Connecting side slat, 30. Through hole, 31. Arc clamping plate, 32. Side electric telescopic rod, 33. L-shaped end frame, 34. Auxiliary rotating rod, 35. Insert ring, 36. Filter screen, 37. Heater strip, 38. Fan, and 39. Concentration cover.

DETAILED DESCRIPTION OF THE EMBODIMENTS

In order to make the technical solutions of the application clearer to those skilled in the art, the application will be further described in detail below in conjunction with the embodiments and the drawings, but the implementation modes of the application are not limited thereto.

Figure 1:
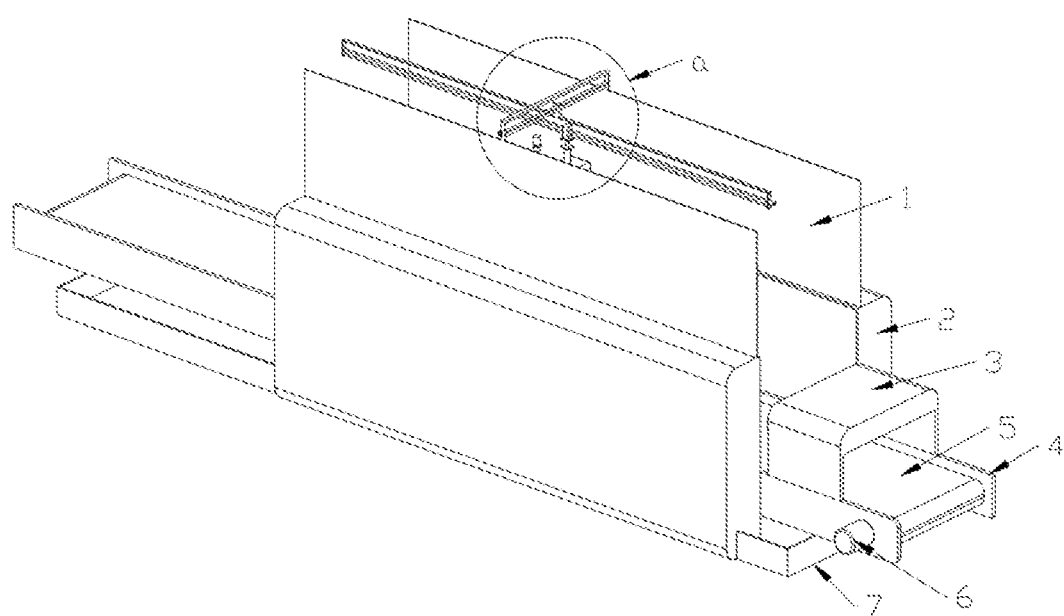
FIG. 1 is a schematic diagram of an overall three-dimensional structure of an apparatus from a first perspective according to a preferred embodiment of a composite reinforced moisture-proof fiberboard, and a preparation apparatus and method of the application.
Figure 2:
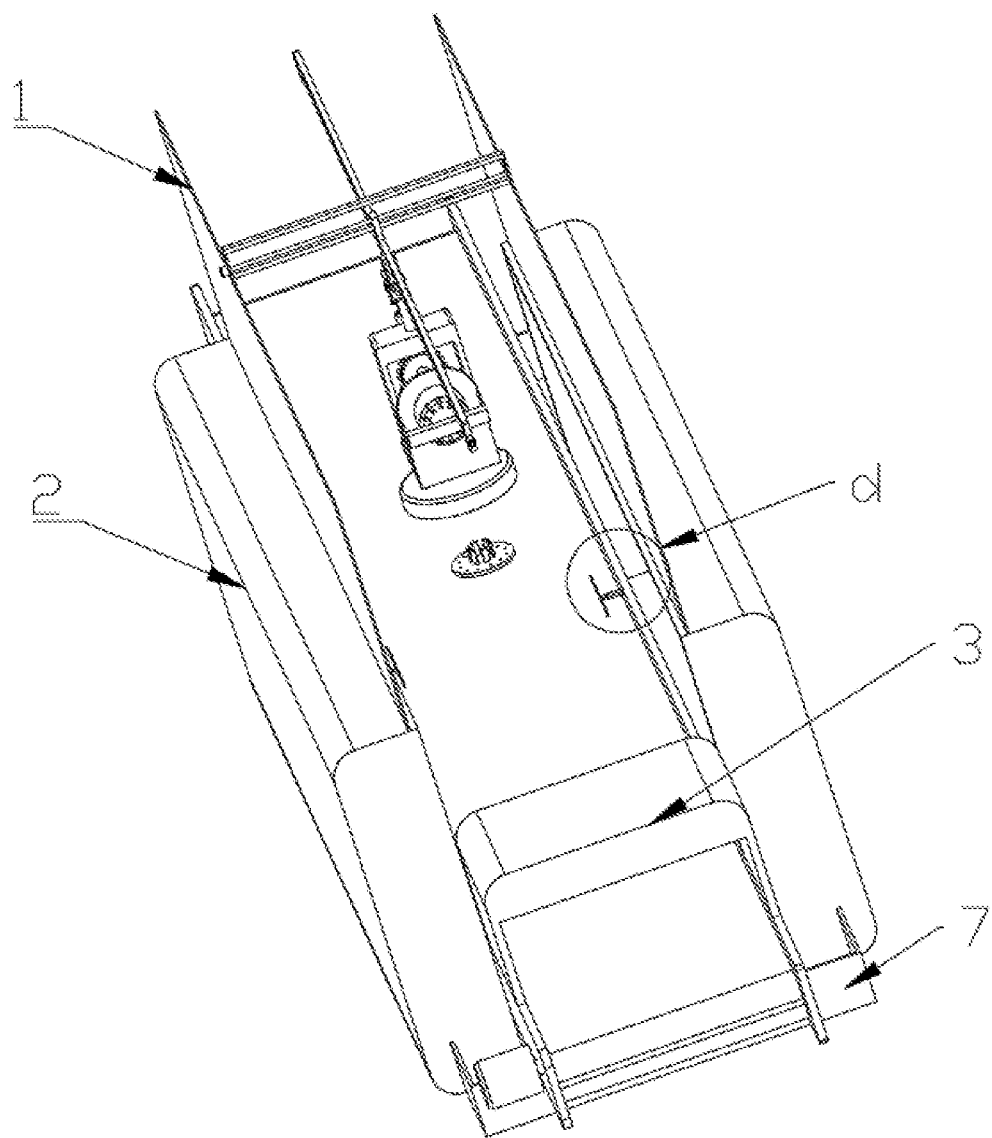
FIG. 2 is a schematic diagram of an overall three-dimensional structure of an apparatus from a second perspective according to a preferred embodiment of a composite reinforced moisture-proof fiberboard, and a preparation apparatus and method of the application.
Figure 3:
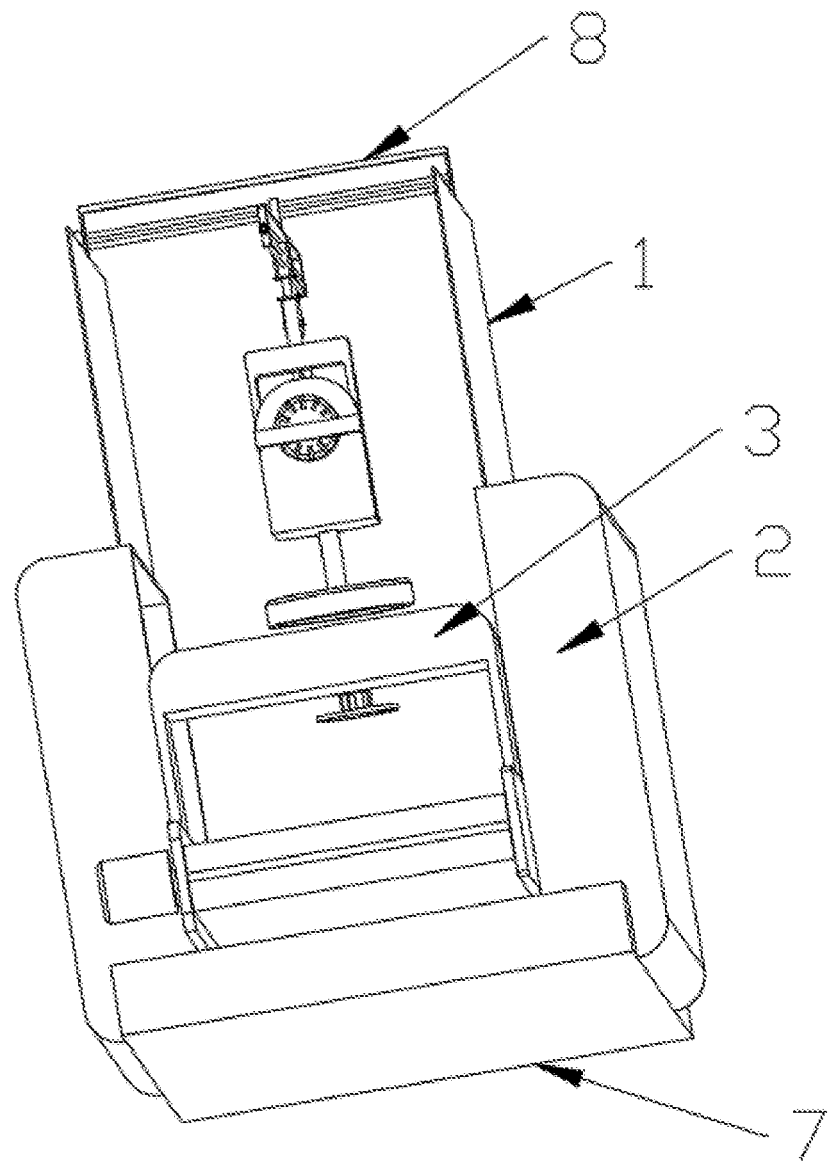
FIG. 3 is a schematic diagram of an overall three-dimensional structure of an apparatus from a third perspective according to a preferred embodiment of a composite reinforced moisture-proof fiberboard, and a preparation apparatus and method of the application.
Figure 4:
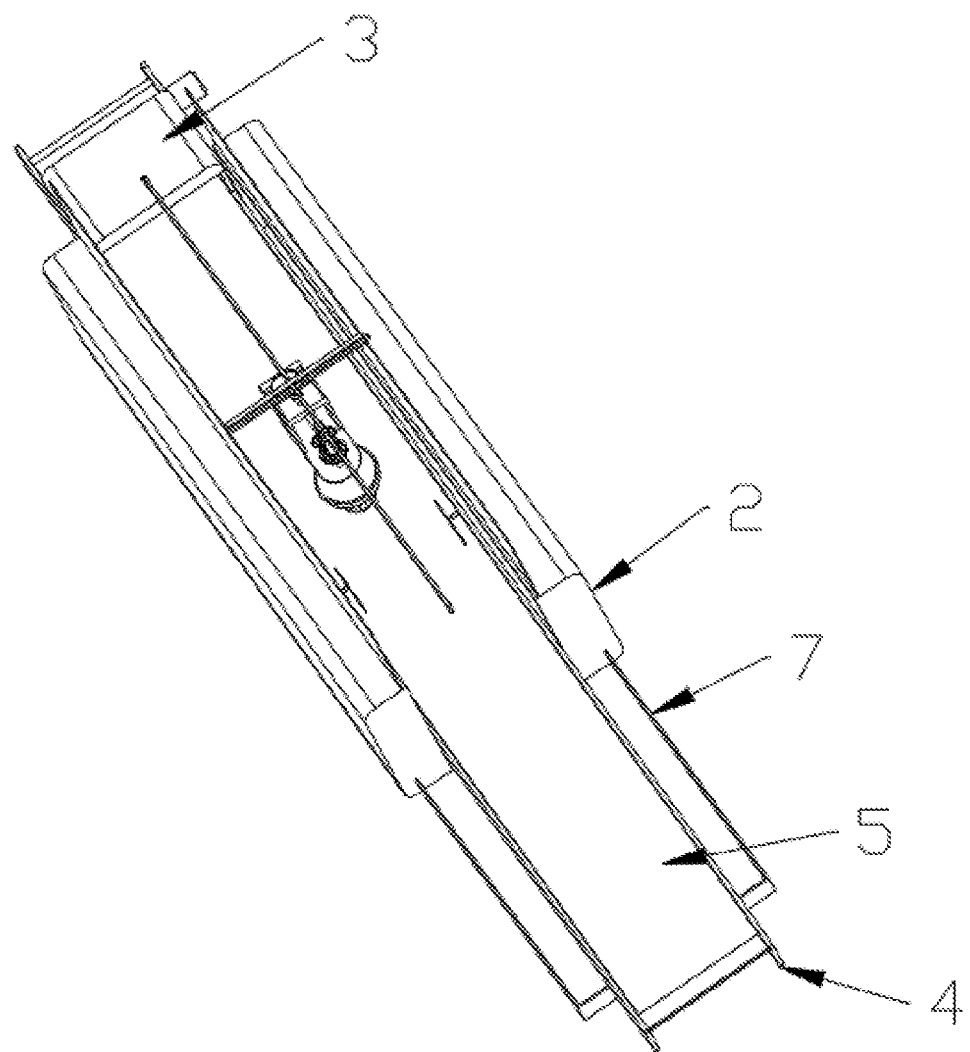
FIG. 4 is a schematic diagram of an overall three-dimensional structure of an apparatus from a fourth perspective according to a preferred embodiment of a composite reinforced moisture-proof fiberboard, and a preparation apparatus and method of the application.
Figure 5:
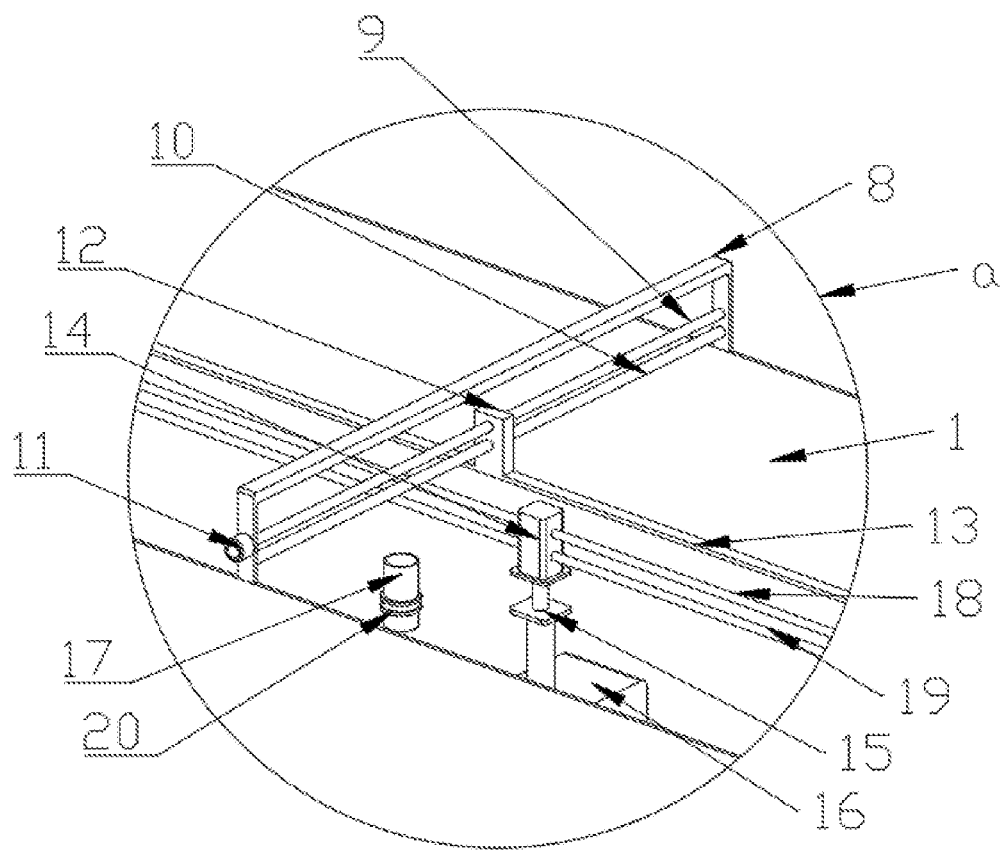
FIG. 5 is an enlarged drawing of a structure at a place a in FIG. 1 of the application.
Figure 6:
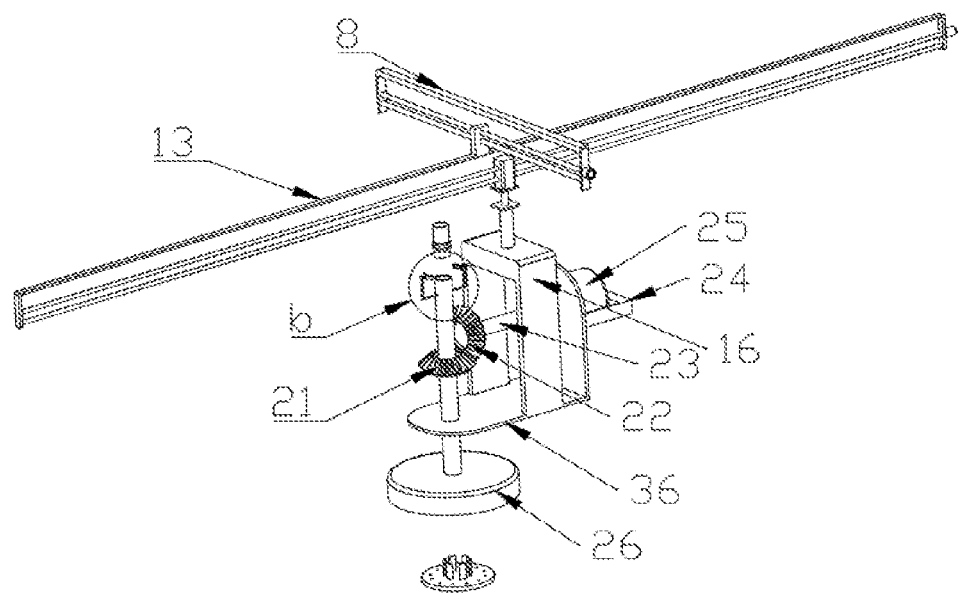
FIG. 6 is a schematic diagram of a three-dimensional structure of a combination of a horizontal moving assembly and a linkage adhesive application and grinding assembly from a first perspective according to a preferred embodiment of a composite reinforced moisture-proof fiberboard, and a preparation apparatus and method of the application.
Figure 7:
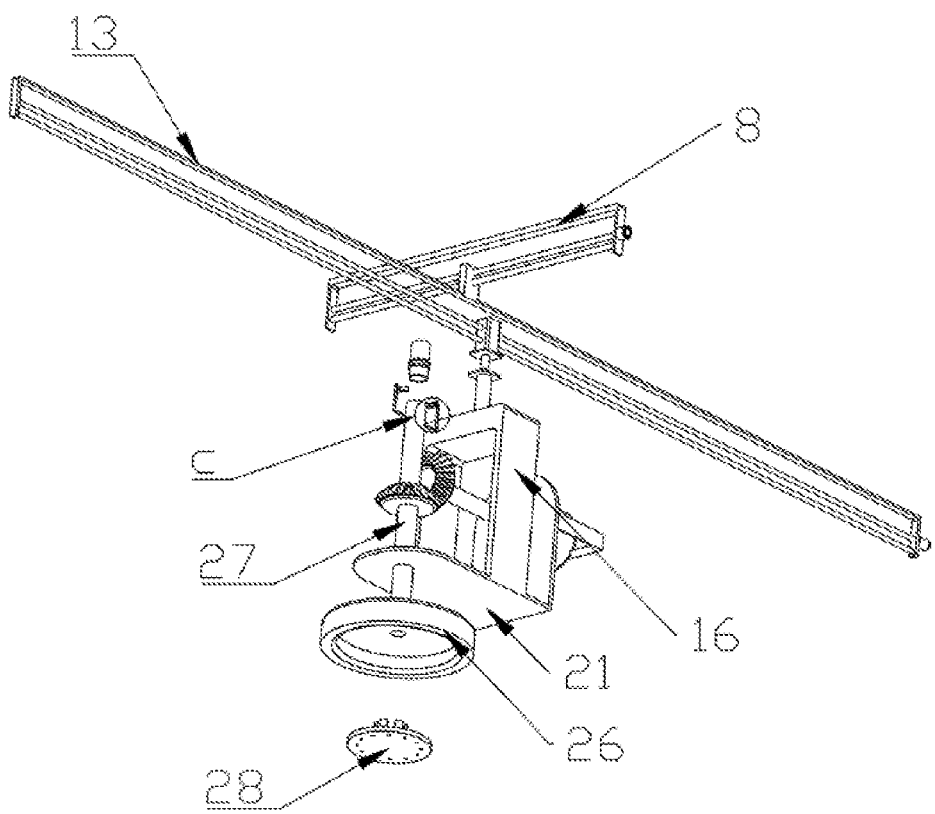
FIG. 7 is a schematic diagram of a three-dimensional structure of a combination of a horizontal moving assembly and a linkage adhesive application and grinding assembly from a second perspective according to a preferred embodiment of a composite reinforced moisture-proof fiberboard, and a preparation apparatus and method of the application.
Figure 8:
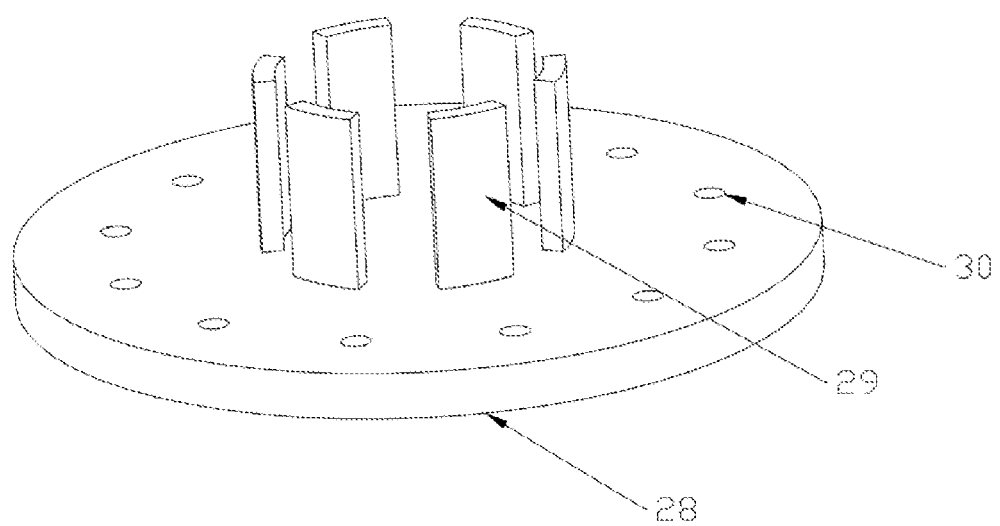
FIG. 8 is a schematic diagram of a three-dimensional structure of a grinding disc assembly according to a preferred embodiment of a composite reinforced moisture-proof fiberboard, and a preparation apparatus and method of the application.
Figure 9:
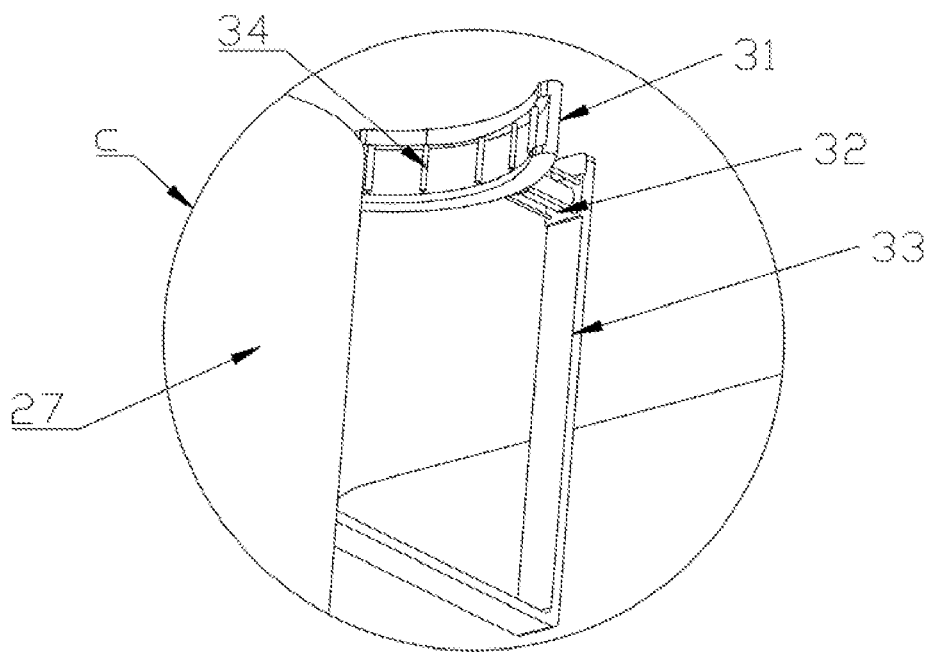
FIG. 9 is an enlarged drawing of a structure at a place c in FIG. 7 of the application.
Figure 10:
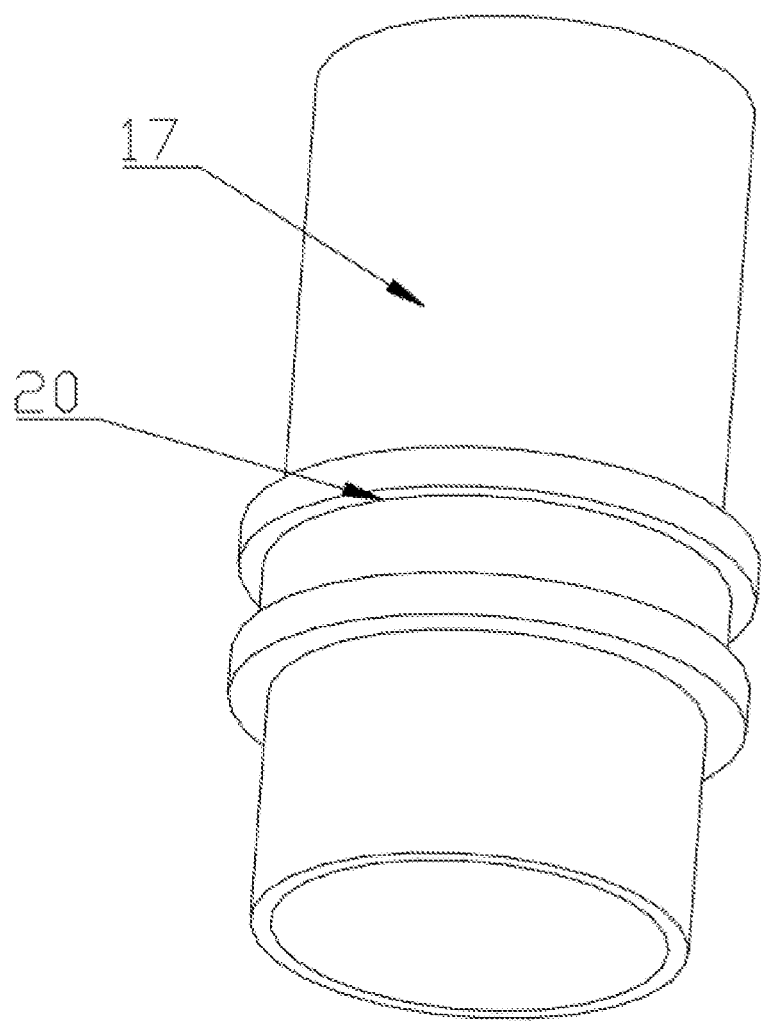
FIG. 10 is a schematic diagram of a three-dimensional structure of a connecting pipe assembly according to a preferred embodiment of a composite reinforced moisture-proof fiberboard, and a preparation apparatus and method of the application.
Figure 11:
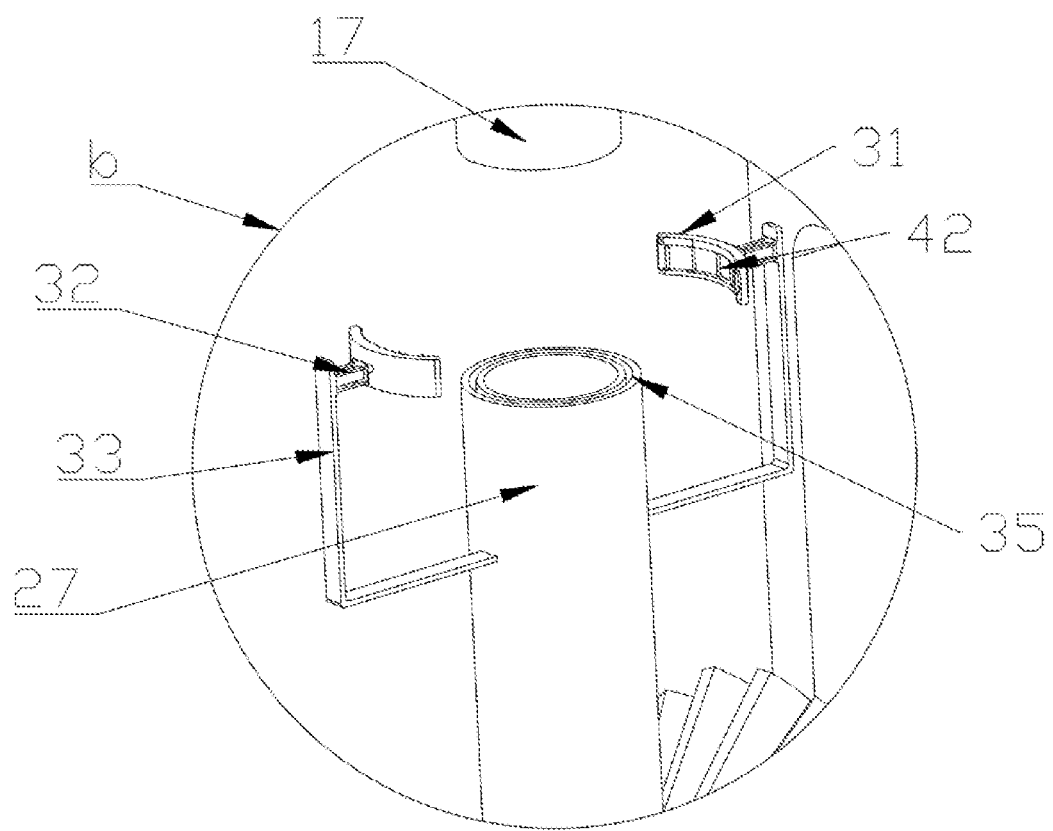
FIG. 11 is an enlarged drawing of a structure at a place b in FIG. 6 of the application.
Figure 12:
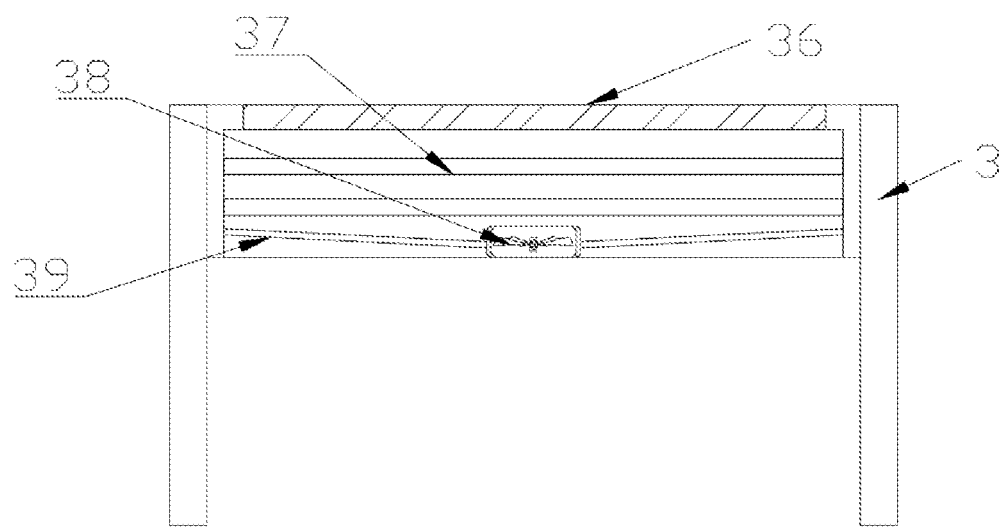
FIG. 12 is a schematic structural diagram of a drying assembly according to a preferred embodiment of a composite reinforced moisture-proof fiberboard, and a preparation apparatus and method of the application.
Figure 13:
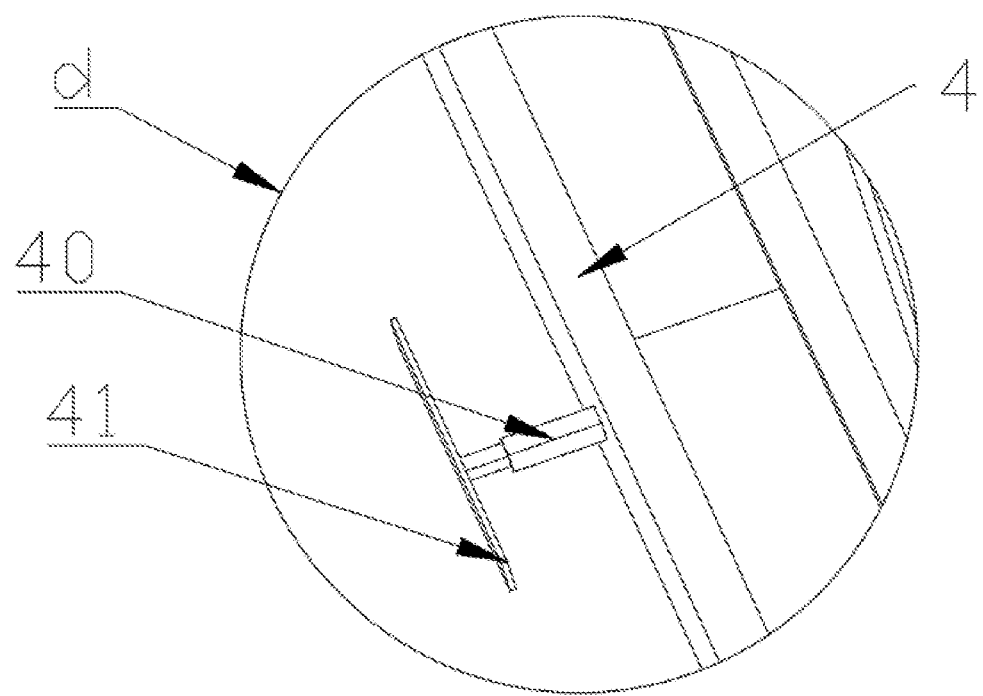
FIG. 13 is an enlarged drawing of a structure at a place d in FIG. 2 of the application.

As shown in FIG. 1 to FIG. 13, a preparation apparatus of a composite reinforced moisture-proof fiberboard provided by the embodiments includes a conveying assembly. Side return covers 2 are installed on both sides of the conveying assembly, a side plate 1 is installed at the top of the side return cover 2, a recovery pool 7 is arranged below the conveying assembly, and the recovery pool 7 communicates with the side return covers 2. A first levelling assembly is installed at the top middle of the side plate 1, a second levelling assembly perpendicular to the first levelling assembly is arranged at an output end of the first levelling assembly, a vertical electric telescopic rod 15 is installed at an output end of the second levelling assembly, a placing frame assembly is installed at an output end of the vertical electric telescopic rod 15, a driving assembly is arranged at the side of the placing frame assembly, a feed rotating cylinder assembly is installed on the placing frame assembly through a bearing, the bottom of the feed rotating cylinder assembly communicates with a grinding disc assembly, the driving assembly drives the feed rotating cylinder assembly through a bevel gear assembly, the top of the feed rotating cylinder assembly communicates with a feed pipe assembly, and the feed pipe assembly is externally connected to a feed pump; and a high temperature drying assembly is arranged at a top end of the conveying assembly, and a side clamping assembly for clamping a wooden board is arranged at the upper middle side of the conveying assembly.

A wooden board that needs an adhesive application process is placed on the conveying assembly and conveyed to a lower part of the grinding disc assembly. Then, the first levelling assembly, the second levelling assembly, and the vertical electric telescopic rod 15 are started to adjust the grinding disc assembly to perform grinding and adhesive application on the wooden board. The feed pump is started to feed the feed pipe assembly, and then the wooden board enters the feed rotating cylinder assembly through the feed pipe assembly and enters the grinding disc assembly through the feed rotating cylinder assembly to perform the adhesive application process. After adhesive application is completed, the conveying assembly is started again to drive the wooden board to move to perform high temperature drying treatment through the high temperature drying assembly. An adhesive solution thrown out during grinding and adhesive application falls onto side return covers 2 and flows back to the recovery pool 7 for collection and reuse, and the adhesive solution located on the conveying assembly may also penetrate through the conveying assembly and fall into the recovery pool 7 for recovery.

In the present embodiment, the conveying assembly includes a side slat 4, a conveyor belt 5, a transmission motor 6, a first transmission roller, and a second transmission roller. The side slat 4 is installed on the inner side of the side return cover 2, the first transmission roller and the second transmission roller are respectively installed on both ends of the inner side of the side slat 4 through the bearing, the conveyor belt 5 sleeves the outer sides of the first transmission roller and the second transmission roller, the transmission motor 6 is installed at an outer end of the side slat 4, and an output end of the transmission motor 6 penetrates through the side slat 4 and is fixed to the first transmission roller.

The transmission motor 6 is started to drive the first transmission roller, the first transmission roller drives the conveyor belt 5 to move, and the conveyor belt 5 drives the second transmission roller to move, so as to drive the conveyor belt 5 to move cyclically, thereby conveying the wooden board.

In the present embodiment, the first levelling assembly includes a first U-shaped frame 8, a first adjusting screw 9, a first horizontal sliding bar 10, a first adjusting slider 12, and a first adjusting motor 11. The first U-shaped frame 8 is installed at the top middle of the side plate 1, the first adjusting screw 9 and the first horizontal sliding bar 10 are arranged on the inner side of the first U-shaped frame 8, the first adjusting motor 11 is installed at an outer end of the first U-shaped frame 8, an output end of the first adjusting motor 11 penetrates through the first U-shaped frame 8 and is fixed to the first adjusting screw 9, the first adjusting slider 12 sleeves the outer sides of the first adjusting screw 9 and the first horizontal sliding bar 10, and the first adjusting slider 12 and the first adjusting screw 9 are engaged with each other.

The first adjusting motor 11 is started to drive the first adjusting screw 9 to rotate, the first adjusting screw 9 drives the first adjusting slider 12 to move on the first adjusting screw 9 and the first horizontal sliding bar 10, so as to drive the grinding disc assembly to move, and the first horizontal sliding bar 10 is arranged to achieve the functions of limiting and auxiliary supporting of the first adjusting slider 12 when moving.

In the present embodiment, the second levelling assembly includes a second U-shaped frame 13, a second horizontal sliding bar 18, a second adjusting screw 19, a second adjusting slider 14, and a second adjusting motor. The second U-shaped frame 13 is installed at the bottom of the first adjusting slider 12, the second adjusting screw 19 and the second horizontal sliding bar 18 are arranged on the inner side of the second U-shaped frame 13, the second adjusting motor is installed at an outer end of the second U-shaped frame 13, an output end of the second adjusting motor penetrates through the second U-shaped frame 13 and is fixed to the second adjusting screw 19, and the second adjusting slider 14 sleeves the outer sides of the second adjusting screw 19 and the second horizontal sliding bar 18.

The second adjusting motor is started to drive the second adjusting screw 19 to rotate, the second adjusting screw 19 drives the second adjusting slider 14 to move on the second horizontal sliding bar 18, so as to drive the second adjusting slider 14 to move, thereby adjusting the grinding disc assembly to move, and the second horizontal sliding bar 18 is arranged to achieve the functions of limiting and auxiliary supporting of the second adjusting slider 14 when moving.

In the present embodiment, the placing frame assembly includes a U-shaped vertical frame 16, a filter screen 36, and a side U-shaped frame 24. The U-shaped vertical frame 16 is installed at an output end of the vertical electric telescopic rod 15, the filter screen 36 is installed at the bottom of the U-shaped vertical frame 16, the side U-shaped frame 24 is installed in the middle of the outer side of the filter screen 36, the driving assembly is arranged on the inner side of the U-shaped frame 24, and the feed rotating cylinder assembly is installed on the filter screen 36 through the bearing.

In the present embodiment, the driving assembly includes an adjusting motor 25 and a horizontal transmission rod 23. The adjusting motor 25 is installed at the inner middle of the side U-shaped frame 24, and the horizontal transmission rod 23 is installed at an output end of the adjusting motor 25.

The adjusting motor 25 is started to drive the horizontal transmission rod 23, and the horizontal transmission rod 23 drives the bevel gear assembly to rotate so as to drive the feed rotating cylinder assembly to rotate.

In the present embodiment, the feed rotating cylinder assembly includes a rotating cylinder 27, an insert ring 35, an L-shaped end frame 33, and a side limit arc frame assembly. The rotating cylinder 27 is installed on the filter screen 36 through the bearing, the insert ring 35 matched with the feed pipe assembly is arranged at the top of the rotating cylinder 27, the L-shaped end frame 33 is installed at the outer top of the rotating cylinder 27, the side limit arc frame assembly is arranged at the inner top of the L-shaped end frame 33, and the side limit arc frame assembly and the feed pipe assembly are matched with each other.

The feed pipe assembly is inserted into the insert ring 35, and the side limit arc frame assembly is started to limit the feed pipe assembly, so that the feed pipe assembly and the rotating cylinder 27 are connected stably.

In the present embodiment, the grinding disc assembly includes a grinding cover 26, a grinding disc 28, through holes 30, and a connecting side slat 29. The bottom of the rotating cylinder 27 communicates with the grinding cover 26, the connecting side slat 29 is installed at a position, close to an opening, of the bottom of the grinding cover 26, the grinding disc 28 is installed at the bottom of the connecting side slat 29, and a plurality of groups of through holes 30 are arranged in the grinding disc 28.

The adhesive solution enters the grinding cover 26 through the rotating cylinder 27, and is distributed on the grinding disc 28 through the grinding cover 26. The adhesive solution may be dispersed through the connecting side slat 29, and may also flow into the lower part of the grinding disc 28 through the through hole 30. Through the high-speed rotation of the grinding disc 28 and the grinding cover 26, more adhesive solutions may be smeared evenly, and small particles in the adhesive solution may also be ground to be finer, thereby improving the smearing smoothness.

In the present embodiment, the bevel gear assembly includes a second bevel gear 22 and a first bevel gear 21. The second bevel gear 22 is installed on an output end of the horizontal transmission rod 23, the outer side of the second bevel gear 22 is engaged with the first bevel gear 21, and the first bevel gear 21 sleeves the outer middle of the rotating cylinder 27.

The horizontal transmission rod 23 rotates to drive the second bevel gear 22 to rotate, the second bevel gear 22 drives the first bevel gear 21 to rotate, and the first bevel gear 21 drives the rotating cylinder 27 to rotate.

In the present embodiment, the feed pipe assembly includes a material lead-in cylinder 17 and an outer stop collar 20. The material lead-in cylinder 17 is inserted into the inner side of the insert ring 35, the outer stop collar 20 is installed at the outer middle of the material lead-in cylinder 17, and the outer stop collar 20 and the side limit arc frame assembly are matched with each other.

The material lead-in cylinder 17 is inserted into the insert ring 35, and the side electric telescopic rod 32 is started to drive the side limit arc frame assembly to be clamped to the inner side of the outer stop collar 20 to limit the material lead-in cylinder 17 to prevent falling.

In the present embodiment, the side limit arc frame assembly comprises an arc clamping plate 31, inner top strips 42, and a side electric telescopic rod 32. The side electric telescopic rod 32 is installed at the inner top of the L-shaped end frame 33, the arc clamping plate 31 is installed at an output end of the side electric telescopic rod 32, and a plurality of groups of inner top strips 42 are arranged on the inner side of the arc clamping plate 31.

The side electric telescopic rod 32 is started to drive the arc clamping plate 31 to be clamped to the inner side of the outer stop collar 20, and the inner top strip 42 and the outer stop collar 20 are matched to limit the material lead-in cylinder 17.

In the present embodiment, the high temperature drying assembly includes a filter screen 36, heater strips 37, a fan 38, a concentration cover 39, and an end drying bin 3. The end drying bin 3 is installed at a top end of the side slat 4, the filter screen 36 is arranged at the inner top of the end drying bin 3, a plurality of groups of heater strips 37 are arranged on the inner side of the end drying bin 3, the concentration cover 39 is arranged at the inner middle of the end drying bin 3, and the fan 38 is arranged at the bottom middle of the concentration cover 39.

The fan 38 is started to enable the air to pass through the filter screen 36 and be heated by the heater strips 37, and then the adhesive solution on the wooden board is dried by the fan 38.

In the present embodiment, the side clamping assembly includes a side clamping electric telescopic rod 40 and a side clamping plate 41. The side clamping electric telescopic rod 40 is installed in the middle of the inner side of the side slat 4, and the side clamping plate 41 is installed at an output end of the side clamping electric telescopic rod 40.

The side clamping electric telescopic rod 40 is started to drive the side clamping plate 41 to clamp the wood.

A preparation method of a preparation apparatus of a composite reinforced moisture-proof fiberboard includes the following steps.

At S1, wood chips are screened through a wood chip classification screen, large stones and long tree branch impurities are removed, metal of the wood chips is removed through an eddy electric iron remover, and the wood chips are cleaned through a wood chip washing machine to remove fine mud and sand impurities.

At S2, after the wood chips are cleaned by the washing machine, the wood chips enter a preheating bin, and water steam is introduced into the bin for preheating, where the temperature of the bin is 60-100° C.

At S3, then cooking is performed, the cooking time is 2.0-5.0 min, and the cooking pressure is 8.0-15 Bar.

At S4, after cooking, a wooden board that needs an adhesive application process is placed on a conveying assembly, and conveyed to a lower part of a grinding disc assembly.

At S5, then, a first levelling assembly, a second levelling assembly, and a vertical electric telescopic rod 15 are started to adjust the grinding disc assembly to perform grinding and adhesive application on the wooden board.

At S6, a feed pump is started to feed a feed pipe assembly, then the wooden board enters a feed rotating cylinder assembly through a feed pipe assembly and enters the grinding disc assembly through the feed rotating cylinder assembly to perform the adhesive application process.

At S7, after adhesive application is completed, the conveying assembly is started again to drive the wooden board to move to perform high temperature drying treatment through a high temperature drying assembly.

At S8, an adhesive solution thrown out during grinding and adhesive application falls onto side return covers 2 and flows back to a recovery pool 7 for collection and reuse, and the adhesive solution located on the conveying assembly may also penetrate through the conveying assembly and fall into the recovery pool 7 for recovery.

At S9, a keyboard type transverse density adjustment device is arranged during a paving process, so as to improve the pavement uniformity of a slab and reduce the density deviation of the slab, thereby controlling the density deviation of the slab within ±3%.

At S10, a hot pressing method is adopted, a hot pressing device is a continuous hot press, a heating medium is conduction oil, the temperature of a hot pressing board is 150-230° C., and the pressure is 0.1-4.0 N/mm$^2$.

A ratio of wood raw materials of the composite reinforced moisture-proof fiberboard is: 50-100% of pine wood and 0-50% of eucalyptus hybrid, and the thickness of the board is 4-12 mm.

A composite flooring substrate produced by the above process has high density (900-1200 kg/m3) and high moisture-proof performance (a thickness swelling rate of water absorption in 24 hours is ≤5%).

The above is only further embodiments of the application and not intended to limit the scope of protection of the application. Any equivalent replacement or change made by those skilled in the art according to the technical solutions and the conception within the scope disclosed by the application shall fall within the scope of protection of the application.

What is claimed is:

1. A preparation apparatus of a composite reinforced moisture-proof fiberboard, comprising a conveying assembly,
wherein a side return covers (2) is installed on both sides of the conveying assembly, a side plate (1) is installed at a top of the side return cover (2), a recovery pool (7) is arranged below the conveying assembly, and the recovery pool (7) communicates with the side return covers (2);

a first levelling assembly is installed at a top middle of the side plate (1), a second levelling assembly perpendicular to the first levelling assembly is arranged at an output end of the first levelling assembly, a vertical electric telescopic rod (15) is installed at an output end of the second levelling assembly, a placing frame assembly is installed at an output end of the vertical electric telescopic rod (15), a driving assembly is arranged at a side of the placing frame assembly, a feed rotating cylinder assembly is installed on the placing frame assembly through a bearing, a bottom of the feed rotating cylinder assembly communicates with a grinding disc assembly, the driving assembly drives the feed rotating cylinder assembly through a bevel gear assembly, a top of the feed rotating cylinder assembly communicates with a feed pipe assembly, and the feed pipe assembly is externally connected to a feed pump;

a high temperature drying assembly is arranged at a top end of the conveying assembly, and a side clamping assembly for clamping a wooden board is arranged at an upper middle side of the conveying assembly;

the conveying assembly comprises a side slat (4), a conveyor belt (5), a transmission motor (6), a first transmission roller, and a second transmission roller, the side slat (4) is installed on an inner side of the side return cover (2), the first transmission roller and the second transmission roller are respectively installed on both ends of an inner side of the side slat (4) through the bearing, the conveyor belt (5) sleeves outer sides of the first transmission roller and the second transmission roller, the transmission motor (6) is installed at an outer end of the side slat (4), an output end of the transmission motor (6) penetrates through the side slat (4) and is fixed to the first transmission roller; and the first levelling assembly comprises a first U-shaped frame (8), a first adjusting screw (9), a first horizontal sliding bar (10), a first adjusting slider (12), and a first adjusting motor (11), the first U-shaped frame (8) is installed at a top middle of the side plate (1), the first adjusting screw (9) and the first horizontal sliding bar (10) are arranged on an inner side of the first U-shaped frame (8), the first adjusting motor (11) is installed at an outer end of the first U-shaped frame (8), an output end of the first adjusting motor (11) penetrates through the first U-shaped frame (8) and is fixed to the first adjusting screw (9), the first adjusting slider (12) sleeves outer sides of the first adjusting screw (9) and the first horizontal sliding bar (10), and the first adjusting slider (12) and the first adjusting screw (9) are engaged with each other;

the second levelling assembly comprises a second U-shaped frame (13), a second horizontal sliding bar (18), a second adjusting screw (19), a second adjusting slider (14), and a second adjusting motor, the second U-shaped frame (13) is installed at a bottom of the first adjusting slider (12), the second adjusting screw (19) and the second horizontal sliding bar (18) are arranged on an inner side of the second U-shaped frame (13), the second adjusting motor is installed at an outer end of the second U-shaped frame (13), an output end of the second adjusting motor penetrates through the second U-shaped frame (13) and is fixed to the second adjusting screw (19), and the second adjusting slider (14) sleeves outer sides of the second adjusting screw (19) and the second horizontal sliding bar (18); and the placing frame assembly comprises a U-shaped vertical frame (16), a filter screen (36), and a side U-shaped frame (24), the U-shaped vertical frame (16) is installed at an output end of the vertical electric telescopic rod (15), the filter screen (36) is installed at a bottom of the U-shaped vertical frame (16), the side U-shaped frame (24) is installed in a middle of the outer side of the filter screen (36), the driving assembly is arranged on an inner side of the side U-shaped frame (24), and the feed rotating cylinder assembly is installed on the filter screen (36) through the bearing;

the driving assembly comprises an adjusting motor (25) and a horizontal transmission rod (23), the adjusting motor (25) is installed at an inner middle of the side U-shaped frame (24), and the horizontal transmission rod (23) is installed at an output end of the adjusting motor (25); and the feed rotating cylinder assembly comprises a rotating cylinder (27), an insert ring (35), an L-shaped end frame (33), and a side limit arc frame assembly, the rotating cylinder (27) is installed on the filter screen (36) through the bearing, the insert ring (35) matched with the feed pipe assembly (35) is arranged at a top of the rotating cylinder (27), the L-shaped end frame (33) is installed at an outer top of the rotating cylinder (27), the side limit arc frame assembly is arranged at an inner top of the L-shaped end frame (33), and the side limit arc frame assembly and the feed pipe assembly are matched with each other;

the grinding disc assembly comprises a grinding cover (26), a grinding disc (28), through holes (30), and a connecting side slat (29), a bottom of the rotating cylinder (27) communicates with the grinding cover (26), the connecting side slat (29) is installed at a position, close to an opening, of a bottom of the grinding cover (26), the grinding disc (28) is installed at a bottom of the connecting side slat (29), and a plurality of groups of through holes (30) are arranged in the grinding disc (28); and the bevel gear assembly comprises a second bevel gear (22) and a first bevel gear (21), wherein the second bevel gear (22) is installed on an output end of the horizontal transmission rod (23), an outer side of the second bevel gear (22) is engaged with the first bevel gear (21), and the first bevel gear (21) sleeves an outer middle of the rotating cylinder (27);

the feed pipe assembly comprises a material lead-in cylinder (17) and an outer stop collar (20), the material lead-in cylinder (17) is inserted into an inner side of the insert ring (35), the outer stop collar (20) is installed at an outer middle of the material lead-in cylinder (17), the outer stop collar (20) and the side limit arc frame assembly are matched with each other; and the side limit arc frame assembly comprises an arc clamping plate (31), inner top strips (42), and a side electric telescopic rod (32), the side electric telescopic rod (32) is installed at the inner top of the L-shaped end frame (33), the arc clamping plate (31) is installed at an output end of the side electric telescopic rod (32), and a plurality of groups of inner top strips (42) are arranged on an inner side of the arc clamping plate (31);

the high temperature drying assembly comprises a filter screen (36), heater strips (37), a fan (38), a concentration cover (39), and an end drying bin (3), the end drying bin (3) is installed at a top end of the side slat (4), the filter screen (36) is arranged at an inner top of the end drying bin (3), a plurality of groups of heater strips (37) are arranged on an inner side of the end drying bin (3), the concentration cover (39) is arranged at an inner middle of the end drying bin (3), and the fan (38) is arranged at a bottom middle of the concentration cover (39);

the side clamping assembly comprises a side clamping electric telescopic rod (40) and a side clamping plate (41), the side clamping electric telescopic rod (40) is installed in a middle of the inner side of the side slat (4), and the side clamping plate (41) is installed at an output end of the side clamping electric telescopic rod (40).

* * * * *